US011634595B2

(12) United States Patent
Detzler et al.

(10) Patent No.: US 11,634,595 B2
(45) Date of Patent: Apr. 25, 2023

(54) ADHESION PROMOTER FOR THERMOPLASTIC POLYOLEFIN SUBSTRATE

(71) Applicant: HELIOS COATINGS INC., Canton, OH (US)

(72) Inventors: David Anthony Detzler, Shelby Township, MI (US); Guenther Bauer, Ottobrunn (DE); Mark Edward Leininger, Ridgewood, NJ (US)

(73) Assignee: HELIOS COATINGS INC., Canton, OH (US)

( * ) Notice: Subject to any disclaimer, the term of this patent is extended or adjusted under 35 U.S.C. 154(b) by 122 days.

(21) Appl. No.: 17/155,758

(22) Filed: Jan. 22, 2021

(65) Prior Publication Data

US 2021/0163760 A1     Jun. 3, 2021

Related U.S. Application Data

(62) Division of application No. 16/700,194, filed on Dec. 2, 2019, now Pat. No. 10,934,441.

(51) Int. Cl.
| C09D 5/24 | (2006.01) |
|---|---|
| C09D 7/61 | (2018.01) |
| B05D 1/04 | (2006.01) |
| C09D 167/00 | (2006.01) |
| B05D 1/06 | (2006.01) |
| B05D 7/00 | (2006.01) |

(52) U.S. Cl.
CPC .............. *C09D 5/24* (2013.01); *B05D 1/045* (2013.01); *B05D 1/06* (2013.01); *B05D 7/584* (2013.01); *C09D 7/61* (2018.01); *C09D 167/00* (2013.01)

(58) Field of Classification Search
CPC . B05D 1/04; B05D 1/06; C09D 5/002; C09D 5/24
See application file for complete search history.

(56) References Cited

U.S. PATENT DOCUMENTS

| 4,268,579 A | * | 5/1981 | Suzuki | C08K 3/36 427/195 |
|---|---|---|---|---|
| 5,379,947 A | | 1/1995 | Williams et al. | |
| 5,585,192 A | | 12/1996 | Sharma | |
| 6,107,404 A | | 8/2000 | Ryntz | |
| 6,203,913 B1 | | 3/2001 | Kondos | |
| 6,262,160 B1 | | 7/2001 | Kawano | |
| 6,296,903 B1 | | 10/2001 | Sapper | |
| 6,297,312 B1 | | 10/2001 | Wang | |
| 6,360,974 B1 | | 3/2002 | Sacharski et al. | |
| 6,455,614 B1 | | 9/2002 | Jackson et al. | |
| 6,593,423 B1 | | 7/2003 | Kondos et al. | |
| 6,610,777 B1 | | 8/2003 | Anderson et al. | |
| 6,664,324 B2 | | 12/2003 | Isomoto et al. | |
| 9,193,880 B2 | | 11/2015 | Allam et al. | |
| 10,286,642 B2 | | 5/2019 | Wykoff et al. | |
| 2006/0219980 A1 | * | 10/2006 | Onoyama | C09D 175/04 252/500 |
| 2007/0029530 A1 | * | 2/2007 | Noda | C08L 77/00 252/511 |
| 2010/0108127 A1 | | 5/2010 | Hayes | |
| 2015/0007885 A1 | | 1/2015 | Hashimoto | |
| 2018/0171084 A1 | | 6/2018 | Hsu et al. | |
| 2019/0292382 A1 | * | 9/2019 | Fozdar | C09D 5/24 |
| 2019/0308904 A1 | | 10/2019 | Koep et al. | |
| 2020/0010698 A1 | * | 1/2020 | Kurashina | C09D 175/06 |

FOREIGN PATENT DOCUMENTS

| CN | 108912989 A | | 11/2018 |
|---|---|---|---|
| CN | 109535901 | * | 3/2019 |
| EP | 0874031 B1 | | 6/2002 |
| EP | 1600484 A1 | | 11/2005 |
| EP | 2009071 A1 | | 12/2008 |
| KR | 20190005666 A | | 1/2019 |
| WO | 9810025 A1 | | 3/1998 |

OTHER PUBLICATIONS

Document#1: https://www.techsil.co.uk/media/wysiwyg/Blog-PDFs/White-Papers/Polyolefin_Bonding_white_paper.pdf (Year: NA).*
Search Report issued in corresponding PCT Application No. PCT/US2020/048731 dated Dec. 10, 2020, 10 pages.

* cited by examiner

*Primary Examiner* — Tabassom Tadayyon Eslami
(74) *Attorney, Agent, or Firm* — Pearne & Gordon LLP

(57) ABSTRACT

An adhesion promoter for non-conductive surfaces is disclosed that combines a polyolefin with co-resins in a colloidal suspension in water. The colloidal suspension in water is prepared from mixing a solid-powder composition that includes the polyolefin and the co-resins with water. The colloidal suspension in water is applied to a low surface energy, non-conductive substrate, such as thermoplastic olefins, in order to make the substrates conductive for electrostatic painting.

16 Claims, No Drawings

ADHESION PROMOTER FOR THERMOPLASTIC POLYOLEFIN SUBSTRATE

CROSS-REFERENCE TO RELATED APPLICATION

This application is a division of U.S. patent application Ser. No. 16/700,194 filed Dec. 2, 2019. The content of the foregoing application is incorporated herein by reference.

FIELD OF THE INVENTION

Disclosed is an adhesion promoter for low surface energy, non-conductive surfaces. More particularly, it relates to an adhesion promoter that is a colloidal suspension in water and applied to low surface energy, non-conductive surfaces.

DESCRIPTION OF RELATED ART

Thermoplastic olefin ("TPO") has desired properties such as moldability, flexibility, and low cost which have helped it gain wide acceptance as the material of choice for automotive fascia and other parts such as body panels, dashboards, cup holders, and door coverings, and as a roofing material. TPO is a blend that includes a thermoplastic (e.g. polypropylene, polyethylene, block copolymer polypropylene), an elastomer (e.g. ethylene propylene rubber, ethylene propylene diene rubber, ethylene-octene, ethylbenzene, styrene ethylene butadiene styrene), and optional fillers (e.g. talc, fiberglass, carbon fiber, calcium carbonate). In addition to being a strong and durable material, TPO is also resistant to UV radiation and temperature extremes.

Automotive OEMs and suppliers of painted parts are required to use electrostatic spray equipment for application of topcoats. The higher transfer efficiency of electrostatic spray application results in less topcoat being sprayed and less emissions of volatile organic compounds ("VOCs") and hazardous air pollutants ("HAPs"). This requires that the surface to be coated has sufficiently low enough surface electrical resistivity to allow the electrostatic process to work. While metals inherently have low surface electrical resistivity, TPO suffers from a lack of paintability due to its low surface energy and high surface electrical resistivity. Accordingly, processes have been developed to modify TPO substrates to allow them to be painted electrostatically.

In order to paint TPO substrates with electrostatic spray equipment, these high surface resistivity compounds require (i) application of a conductive adhesion promoter or (ii) flame treatment followed by application of a conductive primer prior to applying a decorative coating. Unfortunately, both options include a number of problems associated with their use.

Conductive adhesion promoters resolve the problem of paint adhesion to thermoplastic olefin substrates, but come with serious environmental and safety issues. Conductive adhesion promoters face compatibility issues between modified polyolefins, which allow for adhesion to TPO, and co-resins, which allow for subsequent layers to adhere to the adhesion promoter. Modified polyolefins are typically soluble in hydrocarbon solvents (e.g. toluene), but are typically not soluble in oxygenated solvents (e.g. butyl acetate). Co-resins are typically soluble in oxygenated solvents (e.g. butyl acetate) but are not typically soluble in hydrocarbon solvents (e.g. toluene). Based on this incompatibility, mixing and stabilizing the modified polyolefin and co-resins has proved to be challenging.

Current commercially-available modified polyolefins for use in conductive adhesion promoters include (i) chlorine modified polyolefins and (ii) maleic anhydride modified polyolefins. Chlorinated polyolefins ("CPOs") help resolve the incompatibility between the polyolefin and the co-resins included in an adhesion promoter, but come at the expense of gasoline resistance and increased environmental concerns. Halogenated organic compounds, such as CPOs are Persistent Organic Pollutants ("POPs") that are resistant to environmental degradation through chemical, biological, and photolytic processes reflecting the nonreactivity of the carbon-chlorine bond toward hydrolysis and photolytic degradation. CPOs have high lipid solubility and as such they bioaccumulate in fatty tissues. For these reasons, non-chlorine modified polyolefins ("non-CPOs"), such as maleic anhydride modified polyolefins, are preferred. In addition to being more environmentally friendly than CPOs, non-CPOs generally provide improved gasoline resistance. However, non-CPOs have even greater incompatibility with co-resins than CPOs and for this reason have found very limited use. Further, the use of modified polyolefins is limited to high molecular weight compounds to meet standards related to gasoline resistance. Copious amounts of hydrocarbon solvents, such as toluene and xylene, are required to dissolve such high molecular weight CPOs or non-CPOs. Toluene and xylene are Volatile Organic Compounds ("VOCs") and are on the U.S. Environmental Protection Agency's list of Hazardous Air Pollutants ("HAPs"). Furthermore, both toluene and xylene have high electrical resistivity that results in the buildup of dangerous static charge when dosing to a batch or during spray application. The build-up of static electricity can result in a spark leading to a fire. The situation is made still worse by the fact that toluene has an extremely low flash point.

Based on the problems associated with existing conductive adhesion promoters, flame treatment of the TPO substrate followed by application of a conductive primer prior to applying a decorative coating has been developed. However, flame treatment suffers from a lack of robustness and does not make the TPO substrate conductive, which is necessary so that subsequent layers of coatings may be applied electrostatically. Further, flame treatment requires a large amount of energy and results in the production of greenhouse gases by burning natural gas.

The benefits of using TPO are so great that its use is expanding in spite of the paintability problems. It is an objective of the present disclosure to alleviate or overcome one or more of the difficulties related to the prior art. It has been found that polyolefins and co-resins that are incompatible based on their respective solubilities may be compounded together to form a solid-powder composition. The solid-powder composition may be mixed with water to prepare a colloidal suspension in water that includes a polyolefin, co-resins, pigments, conductive agents, and additives. The colloidal suspension in water may be applied to low surface energy, non-conductive surfaces, such as TPO, in order to improve paint adhesion. The colloidal suspension in water avoids the use of organic solvents, and thus provides an option that is more environmentally friendly than existing adhesion promoters. The composition and method of preparing the solid-powder compositions and the colloidal suspensions in water do not include the use of environmentally-dangerous solvents or flame treatment in order to prepare the TPO surfaces for painting.

SUMMARY

A colloidal suspension for application to a non-conductive, low surface energy substrate is provided. The colloidal suspension includes water, a polyolefin, co-resins, a substrate wetting agent, and a conductive agent.

A method of a colloidal suspension for application to a low surface energy, non-conductive substrate is provided. The method includes the following steps: preparing a solid-powder composition comprising co-resins and a polyolefin; extruding the solid-powder composition to prepare an extrudate; and combining the extrudate with water to prepare a colloidal suspension.

A method of preparing a low surface energy, non-conductive substrate for electrostatic painting is disclosed. The method includes the following steps: preparing a solid-powder composition comprising co-resins and a polyolefin; extruding the solid-powder composition to prepare an extrudate; combining the extrudate with water to prepare a colloidal suspension; and preparing a coated substrate by applying the colloidal suspension to a low surface energy, non-conductive substrate.

A further method of preparing a low surface energy, non-conductive substrate for electrostatic painting is disclosed. The method includes the following steps: preparing a water-based slurry comprising a conductive agent; applying the water-based slurry to a low surface energy, non-conductive substrate to prepare a wetted, low surface energy, non-conductive substrate; preparing a solid-powder composition comprising co-resins and a polyolefin; and applying the solid-powder composition to the wetted, low surface energy, non-conductive substrate.

DETAILED DESCRIPTION OF PREFERRED EMBODIMENTS

The terminology as set forth herein is for description of the embodiments only and should not be construed as limiting the invention as a whole.

Herein, when a range such as 5-25 (or 5 to 25) is given, this means preferably at least 5 and, separately and independently, preferably not more than 25. In an example, such a range defines independently at least 5, and separately and independently, not more than 25.

Disclosed herein is a solid-powder composition that includes incompatible polyolefins and co-resins, and the use of the solid-powder composition to prepare a colloidal suspension in water, in order to make a low surface energy, non-conductive surface (i.e. TPO) paintable. The term "non-conductive surface" as it relates to the present disclosure is a surface that has a surface resistivity greater than 10 million ohm-square (10 meg-ohm). The term "low surface energy surface" as it relates to the present disclosure is a surface that has a surface energy less than 35 dyne/cm. The term "incompatible" as it relates to blends of the polyolefins and co-resins means that the individual components are not practically soluble within the same type of solvent. Based on this incompatibility, blends of polyolefins and co-resins separate into distinct layers quickly after being combined in a solvent. This separation results in the mixture being unusable for commercial applications as the mixture must be constantly stirred in order to keep the components evenly dispersed in the solvent. The disclosed process utilizes extrusion (e.g. melt and mix process) to compound the incompatible components (i.e. dry, solid modified polyolefin and co-resins) into a sufficiently homogeneous and stable solid-powder composition. The resulting solid-powder composition is dispersed in water to prepare a colloidal suspension in water, and thus avoids the use of hydrocarbon solvents (e.g. toluene and xylene) and/or oxygenated solvents (e.g. butyl acetate).

The solid-powder composition includes a combination of a polyolefin, co-resins, pigment, a flow control agent, and a degassing agent. The solid-powder composition has the following preferred formulation as shown in Table 1. In Table 1, all values are weight percents. It is to be further understood that a solid-powder composition as herein disclosed need not necessarily draw its entire composition from a single column in Table 1. Such a solid-powder composition may, for example, include one or some component(s) from the "most preferred" column below, other component(s) from the "less preferred" column, and still other component(s) from the "still less preferred" column.

TABLE 1

| Component | Most Preferred Weight Percent | Less Preferred Weight Percent | Still Less Preferred Weight Percent |
| --- | --- | --- | --- |
| Co-resins | 70-77 | 60-87 | 50-97 |
| Polyolefin | 14-16 | 10-30 | 8-50 |
| Pigment | 9-11 | 8-20 | 0-25 |
| Flow control agent | 0.5-1.5 | 0.4-1.7 | 0-2 |
| Degassing agent | 0.25-0.75 | 0.1-1 | 0-2 |

The solid-powder composition is the precursor to the colloidal suspension in water that is applied to the low surface energy, non-conductive substrates, such as TPO substrates. The solid-powder compositions can be stored at ambient temperature for a period of time, for example at least one year. Each of the components from Table 1 above will now be further described.

The co-resins are a combination of a powder-coating resin and a powder-coating crosslinker. The selection of the polyolefin and co-resins to include in the solid-powder composition is based on the desired properties of the final coating. Such properties may include gasoline resistance. Suitable powder-coating resins and powder-coating crosslinkers for use in the co-resins have melt points between 140° F. and 250° F., and include those that are not compatible with the polyolefin used in the solid-powder composition. Suitable powder-coating resins include acrylic resins, epoxy resins, amine modified resins, phenolic resins, saturated and unsaturated polyester resins, urea resins, urethane resins, blocked isocyanate resins, and mixtures thereof. Such powder-coating resins include CRYLCOAT 1574-6 (carboyxlated polyester resin, commercially available from ALLNEX), CRYLCOAT E-37704 (carboyxlated polyester resin, commercially available from ALLNEX), ALMATEX PD 7610 (glycidyl methacrylate resin, commercially available from ANDERSON DEVELOPMENT), and ALMATEX PD 4421 (glycidyl methacrylate resin, commercially available from ANDERSON DEVELOPMENT). Such powder-coating crosslinkers include D.E.R. 661 (epoxy resin reaction product of epichlorohydrin and bisphenol A, commercially available from DOW), D.E.R. 662 (epoxy resin reaction product of epichlorohydrin and bisphenol A, commercially available from DOW), JONCRYL 682 (acrylic emulsion, commercially available from BASF), CURAID 2HDA 100-P (dicarboxylic acid, commercially available from DANICK SPECIALTIES), and SMA 3840 (partial mono ester of a styrene maleic anhydride copolymer, commercially available from TOTAL CRAY VALLEY).

The inclusion of co-resins from a group of conventional powder coating resin systems containing an acid functional polyester resin and an epoxy resin (i.e. polyester/epoxy hybrid) results in incorporating the polyolefin into the crosslinked three-dimensional matrix. Further, epoxy functional acrylic resins in combination with acid containing crosslinkers such as dodecanedioic acid or styrene maleic anhydrides can be used as co-resins. Hybrid systems containing epoxy functional acrylic resin and acid functional polyester resins can also be used as co-resins.

The co-resins are preferably present in the solid-powder composition in an amount of 50% to 97% by weight of the total composition, more preferably from 60% to 87%, and most preferably from 70% to 77%.

The polyolefin is provided to promote adhesion of the coating composition to the substrate. Suitable polyolefins for use in the solid-powder composition have melt points between 140° F. and 250° F., molecular weights between 15,000 and 100,000, and include those that are not compatible with the co-resins used in the solid-powder composition. The polyolefin to be used in the solid-powder composition include homopolymers produced from ethylene, propylene or higher alkylenes, or copolymers from two or more such monomers, unmodified polyolefins, chemically modified polyolefins, such as halogenated (e.g. chlorinated) polyolefins and maleic anhydride polyolefins. Preferably, such polyolefins include SUPERCHLON E-723, E-673, and E-503 (CPOs, commercially available from Nippon Paper Chemicals); ADVANTIS 510W, CP 730-1, and CP 164-1 (non-CPOs, commercially available from Eastman); AUROREN AE 20 and AE-301 (non-CPOs, commercially available from Nippon Paper Chemicals); KOATTRO PB M 8510M and KOATTRO PB M 8911M (unmodified polyolefins, random copolymers of butene-1 with high ethylene content, commercially available from LyondellBasel); HARDLEN series (chlorinated polyolefins modified with maleic anhydride, including HARDLEN CY1321P, HARDLEN CY-9122P, and HARDLEN F-2P, commercially available from Toyobo Co., Ltd.), the TOYO TAC series (maleic anhydride-modified polypropylenes, including TOYO TAC PMA-L, TOYO TAC PMA-KE, TOYO TAC PMA-KH, and TOYO TAC PMA-T (commercially available from Toyobo Co., Ltd.); and TRAPYLEN series (CPOs, including TRAPYLEN 950S, TRAPYLEN 911S, TRAPYLEN 139S, and TRAPYLEN 145S, commercially available from Tramaco).

When the polyolefin includes a maleic anhydride polyolefin, a portion of the polyolefin will hydrolyze to the acid form. This acid functionality provides crosslinking between the maleic anhydride polyolefin and functional groups of the co-resins, such as epoxy groups.

The polyolefin is preferably present in the solid-powder composition in an amount of 8% to 50% by weight of the total composition, more preferably from 10% to 30%, and most preferably from 14% to 16%.

The pigment is provided to introduce color to the coating. This may be a desired feature for either quality control or color enhancement. Suitable pigments to be used in the solid-powder composition include: pigment white (e.g. KRONOS 2300, CAS No. 13463-67-7, commercially available from KRONOS), pigment black (e.g. REGAL 400R, CAS No. 1333-86-4, commercially available from CABOT), pigment conductive grade black (e.g. ENSACO 250G, CAS No. 1333-86-4, commercially available from TIMCAL), pigment yellow (e.g. BAYFERROX 3910, CAS No. 51274-00-1, commercially available from LANXESS), pigment red (HOSTAPERM D3G70, commercially available from CLAMANT), and pigment blue (e.g. HOSTAPERM B2G 03, commercially available from CLAMANT).

The pigment is preferably present in the solid-powder composition in an amount of 0% to 25% by weight of the total composition, more preferably from 8% to 20%, and most preferably from 9% to 11% for all colors except black. When black pigment is used it is preferably present in an amount of 0% to 10% by weight of the total composition, more preferably from 0.2% to 5% and most preferably from 0.5% to 2%.

The flow control agent is provided to reduce the surface tension of the powder particles, prevent craters in the coating, and to reduce orange peel. Suitable flow control agents to be used in the solid-powder composition include polyacrylates, polyethers, silicones, and fluorocarbons. Preferably, such flow control agents include MODAFLOW 6000 (poly(alkylacrylate), commercially available from CYTEC), RESIFLOW PL200 (acrylic copolymer prepared from 2-ethylhexyl acrylate and butyl acrylate, commercially available from ESTRON), and POWDERMATE 570FL (amide modified polyether oligomer, commercially available from TROY).

The flow control agent is preferably present in the solid-powder composition in an amount of 0% to 2% by weight of the total composition, more preferably from 0.4% to 1.7%, and most preferably from 0.5% to 1.5%.

The degassing agent is provided to lower the surface tension and prevent pinholing in the coatings. Suitable degassing agents to be used in the solid-powder composition include benzoin (CAS No. 119-53-9, commercially available from ESTRON), OXYMELT A-2, -4, -6, and -7 (commercially available from ESTRON), and POWDERADD 9025 (polyolefin wax, commercially available from LUBRIZOL).

The degassing agent is preferably present in the solid-powder composition in an amount of 0% to 2% by weight of the total composition, more preferably from 0.1% to 1%, and most preferably from 0.25% to 0.75%.

To prepare the solid-powder composition, each component is weighed out and mixed together. For example, the components may be mixed together mechanically by a standard mechanical mixer.

After the initial mixing step, the mixture is passed through an extruder. The extrusion process heats the mixture to a temperature above the melting temperatures of the polyolefin and the co-resins. The polyolefin and the co-resins are blended together in the extruder and the non-melting ingredient (i.e. pigment) is de-agglomerated and evenly distributed in the mixture. Residence time in the extruder is kept to a minimum to prevent premature crosslinking of the co-resins. For example, the residence time in the extruder may be less than or equal to 30 seconds.

Following the extrusion process, the extrudate is cooled. For example, the extrudate may be passed through chiller rollers. This cooling prevents chemical crosslinking from occurring between the components in the extrudate. The extrudate is then broken down into smaller pieces or chips that can be stored until ready for use in further processing steps. For example, the extrudate may be run through a kibbler to produce smaller pieces that are about 1 inch wide×1 inch long×1/16 inch thick. Based on the nature of the components used in the mixture, the extrusion process may be repeated, wherein the smaller pieces are passed through the extruder one or more additional times for further compounding.

After the extrudate has been cooled and broken into smaller pieces, the particle size of the composition is reduced. For example, a mechanical mill with sieves may be used to reduce the particle size of the composition to have a mean value of 30 to 40 micrometers and a distribution of 10 to 90 micrometers. The resulting solid-powder composition may be stored until ready for later use.

A water-based pre-mixture is prepared by blending the solid-powder composition in water. Optionally, the water used to blend the solid-powder composition is deionized water. The water-based pre-mixture has the following preferred formulation as shown in Table 2. In Table 2, all values are weight percents. It is to be further understood that the water-based pre-mixture as herein disclosed need not necessarily draw its entire composition from a single column in Table 1. Such a water-based pre-mixture may, for example, include one or some component(s) from the "most preferred" column below, other component(s) from the "less preferred" column, and still other component(s) from the "still less preferred" column.

TABLE 2

| Component | Most Preferred Weight Percent | Less Preferred Weight Percent | Still Less Preferred Weight Percent |
| --- | --- | --- | --- |
| Water | 82-86 | 70-90 | 50-95 |
| Solid-powder composition | 14-18 | 10-30 | 5-50 |

The water-based pre-mixture is prepared by mixing the solid-powder composition with water. The components may be mixed together mechanically by a standard mechanical mixer, a paint shaker, a high-speed dissolver using a high-shear blade, or other conventional mixing methods. Optionally, the components may be mixed together by a vertical wet mill or a horizontal wet mill.

The particle size of the solid-powder composition within the water-based pre-mixture is then reduced by milling, such that the particles have a mean value of 3 micrometers and a distribution of 2 to 5 micrometers. Particles of this size will remain free-floating in the water without further separation. The particle size of the components within the water-based pre-mixture may be reduced by further wet milling. The water-based pre-mixture remains stable when stored at room temperature.

A colloidal suspension in water is prepared by combining the water-based pre-mixture with a substrate wetting agent and a conductive agent. Optionally, the colloidal suspension in water may include a viscosity-modifying agent and/or an anti-settling agent. The colloidal suspension in water has the following preferred formulation as shown in Table 3. In Table 3, all values are weight percents. It is to be further understood that the colloidal suspension in water as herein disclosed need not necessarily draw its entire composition from a single column in Table 1. Such a colloidal suspension in water may, for example, include one or some component(s) from the "most preferred" column below, other component(s) from the "less preferred" column, and still other component(s) from the "still less preferred" column.

TABLE 3

| Component | Most Preferred Weight Percent | Less Preferred Weight Percent | Still Less Preferred Weight Percent |
| --- | --- | --- | --- |
| Water-based pre-mixture | 93-96 | 91-97 | 88-98 |
| Substrate wetting agent | 0.25-0.75 | 0.1-1 | 0-1.5 |
| Conductive agent | 4-6 | 3-8 | 0-10 |
| Viscosity-modifying agent | 0-2 | 0-3 | 0-4 |
| Anti-settling agent | 0-0.5 | 0-1 | 0-2 |

The colloidal suspension in water is prepared by blending the water-based pre-mixture with a substrate wetting agent, an optional conductive agent, an optional viscosity-modifying agent, and an optional anti-settling agent. The components may be blended together mechanically by a standard mechanical mixer, a high-speed dissolver using a low-shear blade, or other conventional mixing methods. The colloidal suspension in water can be applied to a low surface energy, non-conductive substrate (e.g. TPO substrate) so that subsequent paint layers (e.g. primers or topcoats) will adhere to the substrate and so that the subsequent paint layers can be applied using electrostatic spraying applications. Each of the components from Table 3 above will now be further described.

The substrate wetting agent is provided to improve wetting and reduce surface tension for the coating. Suitable substrate wetting agents to be used in the colloidal suspension in water include silicone surfactants, polyether-modified siloxanes, and acetylenic surfactants. Preferably, such substrate wetting agents include BYK 3450 (silicone surfactant, commercially available from BYK) and SURFYNOL 440 (ethoxylated acetylenic diol, commercially available from EVONIK).

The substrate wetting agent is preferably present in the colloidal suspension in water in an amount of 0% to 1.5% by weight of the total composition, more preferably from 0.1% to 1%, and most preferably from 0.25% to 0.75%.

The conductive agent is provided to improve electrostatic coating efficiency in the coating and thus make a non-conductive substrate conductive for later finishing (i.e. electrostatic painting). For applications that do not require surface conductivity, the conductive agent may be excluded from the colloidal suspension in water. Suitable conductive agents to be used in the colloidal suspension in water include conductive grade black pigments, dispersions of carbon nanofibers, single-walled carbon nanotubes, multi-walled carbon nanotubes, and mixtures thereof. Preferably, such conductive agents include TUBALL COAT_E $H_2O$ 0.4% (water-based dispersion of single-walled carbon nanotubes, commercially available from OCSiA1) and ENSACO 250G (conductive carbon black commercially available from TIMCAL).

The conductive agent is preferably present in the colloidal suspension in water in an amount of 0% to 10% by weight of the total composition, more preferably from 3% to 8%, and most preferably from 4% to 6%. Optionally, the conductive agent is present in the colloidal suspension in water in an amount of at least 0.1%, 0.2%, 0.4%, 0.6%, 0.8%, 1%, 2%, 3%, 4%, 5%, 6%, 8%, or 10% by weight of the total composition. Optionally, the conductive agent is present in the colloidal suspension in water in an amount not greater than 15%, 10%, 9%, 8%, 7%, 6%, 5%, 4%, 3%, or 2% by weight of the total composition.

The viscosity-modifying agent is provided to improve anti-sagging and anti-settling properties in the coatings. Suitable viscosity-modifying agents to be used in the colloidal suspension in water include, for example, modified ureas, RHEOBYK-420 (solution of a modified urea, commercially available from BYK) and ACRYSOL RM8 (hydrophobically modified ethoxylated urethane, commercially available from DOW).

The viscosity-modifying agent is preferably present in the colloidal suspension in water in an amount of 0% to 4% by weight of the total composition, more preferably from 0% to 3%, and most preferably from 0% to 2%.

The anti-settling agent is provided to increase the viscosity of the coatings. Suitable anti-settling agents to be used in the colloidal suspension in water include, for example, ANTI-TERRA 250 (alkylol ammonium salt of a higher molecular weight acidic polymer, commercially available from BYK) and TAMOL SN (neutral sodium salt of a condensed arylsulfonic acid, commercially available from DOW).

The anti-settling agent is preferably present in the colloidal suspension in water in an amount of 0% to 2% by weight of the total composition, more preferably from 0% to 1%, and most preferably from 0% to 0.5%.

The colloidal suspension in water is applied to the low surface energy, non-conductive substrate by any conventional method, including dipping, brushing, and spraying. For example, a standard spray gun for liquid paint may be used to apply the colloidal suspension in water to the non-conductive substrate (e.g. TPO). Other suitable non-conductive substrates for use with the coating compositions disclosed herein include plastic substrates, such as any thermoplastic or thermosetting non-conductive substrates. For example, other suitable substrates include polycarbonate, polyurethane, thermoplastic polyurethane, acrylonitrile butadiene styrene, thermoplastic elastomer, and polyester thermoset, among others. Transfer efficiency when spraying the colloidal suspension in water is achieved by the same means that applies to conventional liquid adhesion promoters. That is, the droplets of the material being sprayed are wet and stick to the substrate when coming into contact with the substrate.

Once applied to the low surface energy, non-conductive substrate, the coating is allowed to cure or flash at ambient or elevated temperature, based on the materials selected for the coating. The curing/flash temperature and curing/flash time is sufficient to dry the coating to a film, and are based on the temperature, relative humidity, and velocity of the air moving over the coated substrate, as well as the sensitivity of the selected subsequent coatings to any remaining water. The flash times and flash temperatures are substantially the same as for water-borne base coats prior to applying solvent-borne clear coats, which is a practice widely known and understood within the automotive industry.

The coated substrate is then allowed to cool and is ready for application of additional coatings and/or finishing layers. Because the coated substrate is now electrically conductive due to the application of the colloidal suspension in water, the coated substrate may be electrostatically painted with conventional topcoats or other liquid or powder coatings. For example, a finishing layer may be applied via 1K/1K or 1K/2K painting. Following application of the final coating, the coating is allowed to cure or flash at ambient or elevated temperature before being cooled to room temperature.

In an alternative embodiment, a solid-powder composition is prepared as described above. However, rather than being added to water in order to prepare a colloidal suspension in water, the solid-powder composition is applied to a low surface energy, non-conductive substrate that has been wetted with a water-based slurry that includes a conductive agent. In this embodiment, the water-based slurry is applied to the low surface energy, non-conductive substrate (e.g. TPO substrate) in order to make the substrate conductive and wetted. The solid-powder composition is then able to be applied directly to the wetted low surface energy, non-conductive substrate.

In the alternative embodiment, the solid-powder composition includes a combination of a polyolefin, co-resins, pigment, a flow control agent, and a degassing agent. The solid-powder composition has the preferred formulation as shown in Table 1. In Table 1, all values are weight percents.

It is to be further understood that the solid-powder composition as herein disclosed need not necessarily draw its entire composition from a single column in Table 1. Such a solid-powder composition may, for example, include one or some component(s) from the "most preferred" column below, other component(s) from the "less preferred" column, and still other component(s) from the "still less preferred" column. The amount of each component in the solid-powder composition for the alternative embodiment is the same as the amount of each component discussed previously for the first embodiment.

The solid-powder compositions can be stored at ambient temperature for a period of time, for example at least one year. Each of the components from Table 1 is the same as described above. To prepare the solid-powder composition, each component is weighed out and mixed together. For example, the components may be mixed together mechanically by a standard mechanical mixer.

After the initial mixing step, the mixture is passed through an extruder. The extrusion process heats the mixture to a temperature above the melting temperatures of the polyolefin and the co-resins. The polyolefin and the co-resins are blended together in the extruder and the non-melting ingredient (i.e. pigment) is de-agglomerated and evenly distributed in the mixture. Residence time in the extruder is kept to a minimum to prevent premature crosslinking of the co-resins. For example, the residence time in the extruder may be less than or equal to 30 seconds.

Following the extrusion process, the extrudate is cooled. For example, the extrudate may be passed through chiller rollers. This cooling prevents chemical crosslinking from occurring between the components in the extrudate. The extrudate is then broken down into smaller pieces or chips that can be stored until ready for use in further processing steps. For example, the extrudate may be run through a kibbler to produce smaller pieces that are about 1 inch wide×1 inch long×1/16 inch thick. Based on the nature of the components used in the mixture, the extrusion process may be repeated, wherein the smaller pieces are passed through the extruder one or more additional times for further compounding.

After the extrudate has been cooled and broken into smaller pieces, the particle size of the composition is reduced. For example, a mechanical mill with sieves may be used to reduce the particle size of the composition to have a mean value of 30 to 40 micrometers and a distribution of 10 to 90 micrometers. The resulting solid-powder composition is then stored until ready for later application to the wetted low surface energy, non-conductive substrate, which is prepared as follows.

Based on the alternative embodiment, the water-based slurry is applied to the non-conductive substrate before the solid-powder composition in order to make the substrate conductive and wetted. The water-based slurry has the following preferred formulation as shown in Table 4. In Table 4, all values are weight percents. It is to be further understood that the water-based slurry as herein disclosed need not necessarily draw its entire composition from a single column in Table 4. Such a water-based slurry may, for example, include one or some component(s) from the "most preferred" column below, other component(s) from the "less preferred" column, and still other component(s) from the "still less preferred" column. Optionally, the amount of each component in the water-based slurry (i.e. water, the substrate wetting agent, the conductive agent, the viscosity-modifying agent, and the anti-settling agent) for the alternative embodiment is the same as the amount of each component discussed previously for the first embodiment.

TABLE 4

| Component | Most Preferred Weight Percent | Less Preferred Weight Percent | Still Less Preferred Weight Percent |
|---|---|---|---|
| Water | 93-96 | 91-97 | 88-98 |
| Substrate wetting agent | 0.25-0.75 | 0.1-1 | 0-1.5 |
| Conductive agent | 4-6 | 3-8 | 0.1-10 |
| Viscosity-modifying agent | 0-2 | 0-3 | 0-4 |
| Anti-settling agent | 0-0.5 | 0-1 | 0-2 |

The water-based slurry is prepared by mixing the substrate wetting agent, the conductive agent, and the optional viscosity-modifying agent and anti-settling agent with water. The components may be mixed together mechanically by a standard mechanical mixer, a paint shaker, a high-speed dissolver using a high-shear blade, or other conventional mixing methods. Optionally, the components may be mixed together by a vertical wet mill or a horizontal wet mill.

The water-based slurry is then applied to a low surface energy, non-conductive substrate (e.g. TPO). For example, the water-based slurry may be sprayed with a standard spray gun used for liquid paint in a thin layer onto the low surface energy, non-conductive substrate. In another example, the low surface energy, non-conductive substrate may be dipped into the water-based slurry, which permits applying the water-based slurry to complex, three-dimensional shaped substrates that may be difficult to coat with a liquid spray. Regardless of how it is applied, the water-based slurry adheres to the low surface energy, non-conductive substrate because it is wet and creates a thin film on top of the substrate, and thus allows for further painting applications.

Following application of the water-based slurry to the low surface energy, non-conductive substrate, the substrate is wetted and the solid-powder composition is applied to the substrate using conventional powder coating equipment. The solid-powder composition adheres to the wetted substrate, and is then allowed to cure or flash at ambient or elevated temperature, based on the materials selected for the coating. The curing/flash temperature and curing/flash time is sufficient to dry the coating to a film, and are based on the temperature, relative humidity, and velocity of the air moving over the coated substrate, as well as the sensitivity of the selected subsequent coatings to any remaining water. The flash times and flash temperatures are substantially the same as for water-borne base coats prior to applying solvent-borne clear coats, which is a practice widely known and understood within the automotive industry.

The coated substrate is then allowed to cool and is ready for application of additional coatings and/or finishing layers. Because the coated substrate is now electrically conductive due to the application of the conductive agent in the water-based slurry, the coated substrate may be electrostatically painted with conventional topcoats or other liquid or powder coatings. For example, a finishing layer may be applied via 1K/1K or 1K/2K painting. Following application of the final coating, the coating is allowed to cure or flash at ambient or elevated temperature before being cooled to room temperature.

EXAMPLES

The examples in the following table further illustrate various aspects of the disclosed solid-powder composition and its use in preparing colloidal suspension in water for application to a low surface energy, non-conductive surface. In the following examples, all composition data are given as weight percents for the specified component based on the total composition for each example. The coatings prepared in the examples were tested for the percent retention in gasoline immersion tests as described herein.

Example 1—Preparation of Solid-Powder Composition for Use in Colloidal Suspension of Water The following solid-powder composition in Table 5 was prepared. All amounts are in weight percent based on the total solid-powder composition weight.

TABLE 5

| Ingredient | Weight Percent |
|---|---|
| Co-resin - Crylcoat 1574-6 polyester resin | 41.5 |
| Co-resin - D.E.R. 662 epoxy resin | 32.0 |
| Polyolefin - PMA-T Non-CPO polyolefin | 15.0 |
| Pigment - Kronos 2300 white pigment | 10.0 |
| Flow-Control Agent - Modaflow 600 | 1.0 |
| Degassing Agent - Benzoin | 0.5 |
| Total | 100.0 |

The ingredients in Table 5 were dry mixed with a mechanical mixer (MIXACO machine) in order to prepare a solid-powder composition. The solid-powder composition was then melt mixed through a twin-screw extruder having a length to diameter ratio of at least 19:1. The compounding zone temperature was maintained between 85° C. and 115° C. and the feeder rate was maintained to produce a torque between 60% and 90%. The resulting extrudate was then pressed into a sheet and cooled by chiller rolls. The resulting extrudate sheet was then crushed into chips by a kibbler. The chips were then passed through an air classifying mill to achieve a particle size of about 30 microns, which were then passed through a vibratory tray sieve to remove any oversized particles.

Example 2—Preparation of Water-Based Pre-Mixture

The following water-based pre-mixture in Table 6 was prepared. All amounts are in weight percent based on the total water-based pre-mixture weight.

TABLE 6

| Ingredient | Weight Percent |
|---|---|
| Solid-powder composition of Example 1 | 15.5 |
| Deionized water | 84.5 |
| Total | 100.0 |

The water-based pre-mixture was prepared by adding the solid-powder composition of Example 1 to deionized water while mixing in a high-speed disperser fitted with a high-shear blade. The water-based pre-mixture was then passed through a horizontal bead mill (CB MILLS Dyno-mill) to produce the water-based pre-mixture having a mean particle size of 3 micrometers.

Example 3—Preparation of Colloidal Suspension in Water

The following colloidal suspension in water in Table 7 was prepared. All amounts are in weight percent based on the total colloidal suspension in water weight.

TABLE 7

| Ingredient | Weight Percent |
|---|---|
| Water-based pre-mixture of Example 2 | 94.5 |
| Substrate wetting agent - BYK-3450 | 0.50 |
| Conductive agent - TUBALL COAT_E H$_2$O 0.4% | 5.0 |
| Total | 100.0 |

The colloidal suspension in water was prepared by adding a substrate wetting agent (BYK-3450) and a conductive agent (TUBALL COAT_E H$_2$O 0.4%) to the water-based pre-mixture of Example 2 while mixing in a high-speed disperser fitted with a low-shear blade.

Example 4—Application of Colloidal Suspension in Water to Low Surface Energy, Non-Conductive Substrate The colloidal suspension in water as prepared in Example 3 was applied with a standard spray gun (SATAminijet® 3000B) in one coat to achieve a dry film thickness of 3-5 micrometers) onto a low surface energy, non-conductive TPO substrate. The coated substrate was then air flashed at room temperature for 10 minutes. A 1K melamine white topcoat and a 1K melamine clear coat were then applied to the coated substrate, which was then baked at 250° F. for 30 minutes. The coated substrate was then cooled at room temperature for 2 hours.

Gasoline Soak Test Protocol and Results

The coated TPO substrate of Example 4 was subjected to gasoline soak test conditions to determine the percent retention of a coating on the TPO substrate. The initial adhesion, recorded at time=0 minutes for each sample, was tested in accordance with ASTM D 3359B using parallel cuts separated by 2 mm and using Scotch brand 898 tape. Coated substrate panels were then immersed in synthetic gasoline consisting of a blend of 45% isooctane, 45% toluene, and 10% ethanol. After immersion, the panels were removed from the gasoline, dried, and tested for adhesion again with results being recorded based on the percent retention. This continued for 2 hours with samples being removed and tested every 15 minutes, as shown in Table 9.

Samples 1-13 and 15-21 provided in Table 8 were prepared according to the conditions described for Examples 1-3. The polyolefin used in each sample is provided in Table 8. The co-resins used to prepare samples 1-13 and 15-21 included 22 parts Crylcoat 1574-6 (commercially available from Allnex) and 17 parts D.E.R. 662 (commercially available from Olin). The weight percent ratio of polyolefin to co-resins for samples 1-13 and 15-21 is provided in Table 8. Sample 14 was the first control that used a commercially available, solvent-borne liquid adhesion promoter (MPP 4100DA, commercially available from PPG) instead of an adhesion promoter based on a colloidal suspension in water as described herein. Sample 21 was the second control and was a colloidal suspension in water but did not include any polyolefin.

TABLE 8

| Sample # | Tradename (Supplier) | Polyolefin type | Weight percent ratio of polyolefin to co-resins |
|---|---|---|---|
| 1 | PB M 8510M (Lyondell-Basel) | Unmodified polyolefin | 50/50 |
| 2 | PB M 8911M (Lyondell-Basel) | Unmodified polyolefin | 50/50 |
| 3 | CP 730-1 (Eastman) | Chlorine modified polyolefin (with 22% chlorine) | 50/50 |
| 4 | CP 164-1 (Eastman) | Chlorine modified polyolefin (with 21% chlorine) | 50/50 |
| 5 | CY1321P (Toyobo) | Chlorine modified polyolefin (with 21% chlorine) | 50/50 |
| 6 | CY9122P (Toyobo) | Chlorine modified polyolefin (with 22% chlorine and 1.6% maleic anhydride) | 50/50 |
| 7 | F-2P (Toyobo) | Chlorine modified polyolefin (with 20% chlorine) | 50/50 |
| 8 | PMA-L (Toyobo) | Non-chlorine modified polyolefin (with 1.5% maleic anhydride) | 50/50 |
| 9 | PMA-KE (Toyobo) | Non-chlorine modified polyolefin (with 1.0% maleic anhydride) | 50/50 |
| 10 | PMA-T (Toyobo) | Non-chlorine modified polyolefin (with 1.5% maleic anhydride) | 50/50 |
| 11 | 1395 (Tramaco) | Chlorine modified polyolefin (with 11% chlorine) | 50/50 |
| 12 | 1455 (Tramaco) | Chlorine modified polyolefin (with 15% chlorine) | 50/50 |
| 13 | 9115 (Tramaco) | Non-chlorine modified polyolefin (with maleic anhydride) | 50/50 |
| 14 | MPP 4100DA (PPG) | Solvent-borne liquid adhesion promoter | n/a |
| 15 | PMA-T (Toyobo) | Non-chlorine modified polyolefin (with 1.5% maleic anhydride) | 50/50 |
| 16 | PMA-T (Toyobo) | Non-chlorine modified polyolefin (with 1.5% maleic anhydride) | 40/60 |
| 17 | PMA-T (Toyobo) | Non-chlorine modified polyolefin (with 1.5% maleic anhydride) | 30/70 |
| 18 | PMA-T (Toyobo) | Non-chlorine modified polyolefin (with 1.5% maleic anhydride) | 20/80 |
| 19 | PMA-T (Toyobo) | Non-chlorine modified polyolefin (with 1.5% maleic anhydride) | 15/85 |
| 20 | PMA-T (Toyobo) | Non-chlorine modified polyolefin (with 1.5% maleic anhydride) | 10/90 |
| 21 | PMA-T (Toyobo) | Non-chlorine modified polyolefin (with 1.5% maleic anhydride) | 0/100 |

Samples 1-21 were then applied to non-conductive TPO substrates as described in Example 4. Following preparation of coated TPO substrates, each sample was tested in a two-hour gasoline immersion test as described herein.

TABLE 9

| | Percent retention at X minutes | | | | | | | | |
|---|---|---|---|---|---|---|---|---|---|
| Sample | 0 min | 15 min | 30 min | 45 min | 60 min | 75 min | 90 min | 105 min | 120 min |
| 1 | 20 | 0 | 0 | 0 | 0 | 0 | 0 | 0 | 0 |
| 2 | 100 | 90 | 75 | 20 | 10 | 0 | 0 | 0 | 0 |

TABLE 9-continued

| | Percent retention at X minutes | | | | | | | | |
|---|---|---|---|---|---|---|---|---|---|
| Sample | 0 min | 15 min | 30 min | 45 min | 60 min | 75 min | 90 min | 105 min | 120 min |
| 3 | 100 | 32 | 0 | 0 | 0 | 0 | 0 | 0 | 0 |
| 4 | 100 | 100 | 50 | 10 | 0 | 0 | 0 | 0 | 0 |
| 5 | 100 | 98 | 96 | 50 | 10 | 0 | 0 | 0 | 0 |
| 6 | 100 | 100 | 84 | 10 | 0 | 0 | 0 | 0 | 0 |
| 7 | 100 | 100 | 98 | 96 | 70 | 20 | 10 | 0 | 0 |
| 8 | 100 | 96 | 24 | 0 | 0 | 0 | 0 | 0 | 0 |
| 9 | 100 | 100 | 100 | 100 | 100 | 90 | 80 | 76 | 74 |
| 10 | 100 | 100 | 100 | 100 | 100 | 100 | 100 | 100 | 100 |
| 11 | 100 | 0 | 0 | 0 | 0 | 0 | 0 | 0 | 0 |
| 12 | 100 | 90 | 82 | 28 | 0 | 0 | 0 | 0 | 0 |
| 13 | 100 | 100 | 50 | 32 | 8 | 0 | 0 | 0 | 0 |
| 14 | 100 | 100 | 100 | 100 | 100 | 100 | 100 | 100 | 100 |
| 15 | 100 | 100 | 100 | 100 | 100 | 100 | 100 | 100 | 100 |
| 16 | 100 | 100 | 100 | 100 | 100 | 100 | 100 | 100 | 100 |
| 17 | 100 | 100 | 100 | 100 | 100 | 100 | 100 | 100 | 100 |
| 18 | 100 | 100 | 100 | 100 | 100 | 100 | 100 | 100 | 100 |
| 19 | 100 | 100 | 100 | 100 | 100 | 100 | 100 | 100 | 100 |
| 20 | 100 | 100 | 100 | 100 | 100 | 100 | 100 | 100 | 100 |
| 21 | 0 | 0 | 0 | 0 | 0 | 0 | 0 | 0 | 0 |

As shown in Table 9, samples 1-13 compared coatings that included 50% polyolefin/50% co-resins, wherein each sample included a different polyolefin type to determine the percent retention of the coating during gasoline testing. Control sample 21 included no polyolefin resulting in 0% retention at 0 minutes (i.e. initial adhesion was 0%). Samples 7, 9, and 10 provided some level of retention (10%, 80%, 100%, respectively) of the coating to the substrate after 90 minutes. Samples 9 and 10 provided improved retention of the coating through the two-hour testing protocol, wherein both samples included non-chlorine modified polyolefins with 1.0% and 1.5% maleic anhydride present, respectively. Control sample 14, prepared with a toluene-based commercially-available adhesion promoter provided the same percent retention for the coating as sample 10. However, sample 10 was prepared with an adhesion promoter based on the disclosed colloidal suspension in water, which does not have the environmental and health concerns associated with the toluene-based adhesion promoter of sample 14.

Samples 15-20 used the same polyolefin that was used in sample 10, but the amount of co-resins was varied. Samples 15-20 all provided the same retention properties after two hours, wherein the ratio of polyolefin to co-resins varied from 1:1 to 1:9. These results show that adhesion promoters based on the disclosed colloidal suspension in water with reduced amounts of the polyolefin provide the same retention properties as the commercially-available toluene-based adhesion promoters.

Illustrative embodiments have been described, hereinabove. It will be apparent to those skilled in the art that the above compositions and methods may incorporate changes and modifications without departing from the scope of this disclosure. The disclosure is therefore not limited to particular details of this disclosure, and will encompass modifications and adaptations thereof within the spirit and scope of the appended claims.

What is claimed is:

1. A method of preparing a low surface energy, non-conductive substrate for electrostatic painting, comprising:
    a. preparing a water-based slurry comprising a conductive agent;
    b. applying the water-based slurry to a low surface energy, non-conductive substrate to prepare a wetted, low surface energy, non-conductive substrate;
    c. preparing a dry solid-powder composition comprising co-resins and a polyolefin; and
    d. applying the dry solid-powder composition to the wetted, low surface energy, non-conductive substrate.

2. The method of claim 1, the dry solid-powder composition further comprising a pigment, a flow-control agent, and a degassing agent.

3. The method of claim 1, wherein the conductive agent is present in an amount from 0.1-10 weight percent of the water-based slurry.

4. The method of claim 1, wherein the conductive agent comprises single-walled carbon nanotubes.

5. The method of claim 1, wherein the polyolefin is a non-chlorine modified polyolefin.

6. The method of claim 1, wherein the low surface energy, non-conductive substrate is a thermoplastic olefin.

7. The method of claim 1, the water-based slurry further comprising a substrate wetting agent and optionally (i) a viscosity-modifying agent and/or (ii) an anti-settling agent.

8. The method of claim 1, further comprising passing the dry solid-powder composition through an extruder prior to the step of applying the dry solid-powder composition to the wetted, low surface energy, non-conductive substrate.

9. The method of claim 1, further comprising milling the dry solid-powder composition prior to the step of applying the dry solid-powder composition to the wetted, low surface energy, non-conductive substrate.

10. The method of claim 9, wherein a particle size of the dry solid-powder composition after milling is 10 to 90 micrometers.

11. The method of claim 1, further comprising curing the substrate after applying the dry solid-powder composition to the wetted, low surface energy, non-conductive substrate.

12. The method of claim 1, further comprising applying a finishing coat after applying the dry solid-powder composition to the wetted, low surface energy, non-conductive substrate.

13. The method of claim 12, wherein the finishing coat is applied via electrostatic painting.

14. The method of claim 12, wherein the finishing coat is applied via 1K or 2K painting.

15. The method of claim 1, wherein the co-resins and the polyolefin are insoluble in water.

16. The method of claim 1, wherein the co-resins and the polyolefin are incompatible.

* * * * *